United States Patent
Dudley

[11] Patent Number: 5,268,576
[45] Date of Patent: Dec. 7, 1993

[54] INFRARED FOCAL PLANE ARRAY PROCESSOR WITH INTEGRATION AND LOW PASS FILTER PER PIXEL

[75] Inventor: Dana Dudley, Dallas, Tex.

[73] Assignee: Texas Instruments Incorporated, Dallas, Tex.

[21] Appl. No.: 942,113

[22] Filed: Sep. 8, 1992

Related U.S. Application Data

[63] Continuation of Ser. No. 680,500, Apr. 4, 1991, abandoned.

[51] Int. Cl.$^5$ ............................................. H01L 31/02
[52] U.S. Cl. ...................................... 250/332; 250/330
[58] Field of Search ..................... 250/332, 330, 338.1

[56] References Cited

U.S. PATENT DOCUMENTS 4,902,894  2/1990  Butler et al. ................... 250/332
4,987,305  1/1991  Bornstein et al. ............... 250/352

*Primary Examiner*—Paul M. Dzierzynski
*Assistant Examiner*—Richard Hanig
*Attorney, Agent, or Firm*—René E. Grossman; Richard L. Donaldson

[57] ABSTRACT

A circuit and method of detecting infrared radiations with a focal plane array circuit member comprising storing a charge in a storage device indicative of the intensity of received infrared radiations, periodically transferring the stored charge and then resetting the storage device, storing the transferred charge, providing an output terminal and providing a low pass filter coupled between the output terminal and the storage means.

20 Claims, 1 Drawing Sheet

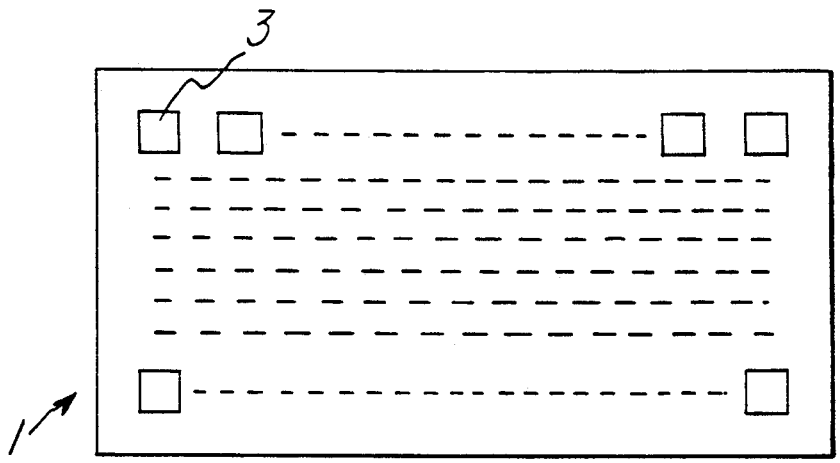
Fig.1
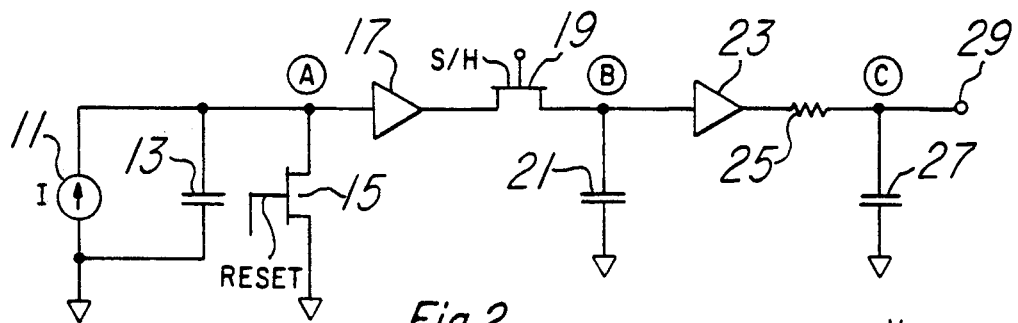
Fig.2
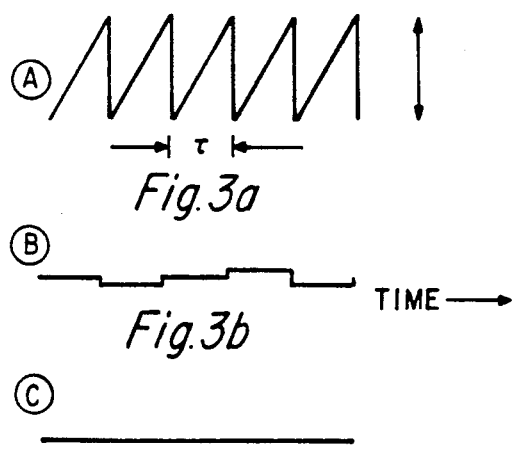
Fig.3a
Fig.3b
Fig.3c
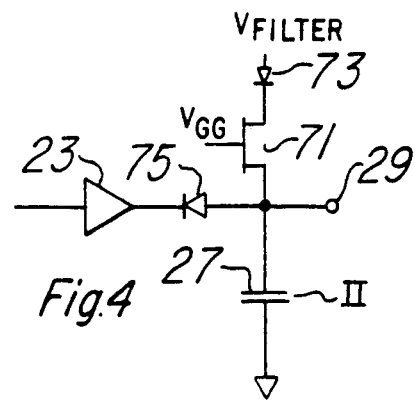
Fig.4

INFRARED FOCAL PLANE ARRAY PROCESSOR WITH INTEGRATION AND LOW PASS FILTER PER PIXEL

This application is a continuation of application Ser. No. 07/680,500, filed Apr. 4, 1991 now abandoned.

BACKGROUND OF THE INVENTION

1. Field of the Invention

This invention relates to a signal processor circuit for use individually in conjunction with each pixel of a focal plane array (FPA) to improve the signal to noise ratio of the output of each pixel of the array.

2. Brief Description of the Prior Art

Focal plane arrays and particularly focal plane staring arrays are composed of a plurality of infrared detector elements or pixels in a matrix arrangement (e.g., 64 pixels × 64 pixels) which are generally cooled to a temperature in the range of liquid nitrogen (77° K.). The array is stationary so that each element of the array continually stares at the same portion of the scene. Since nothing is changing, advantage of this fact is taken by performing integration over some period of time, it being apparent that the longer the integration, the more the signal will build with respect to the noise. This is due to the fact that the signal level is multiplied by the amount of time that integration takes place whereas the noise is multiplied by the square root of time and is therefore smaller, thereby improving the signal to noise ratio.

Each detector element includes a capacitor which accumulates charge thereon from a portion of the scene under observation, the time accumulation of charge resulting in an integration. Both signal and noise current are integrated onto the capacitor. It is desirable that the capacitors be large so that they can hold more charge and permit integration over extended periods of time as indicated above. However, the capacitance of capacitors is area dependent, so large value capacitors require large device area relative to the size of each pixel and cannot be easily accommodated as a part of the array. For this reason, the capacitors are generally very small and accommodated as part of the array.

Since the capacitor charging signal current can be rather large, it follows that the small capacitance value capacitor can only integrate for a given possibly relatively short time before the voltage across the capacitor becomes so large that the capacitor can no longer handle further accumulated charge thereon. This means that a substantial portion of the potential charging time is not used and is wasted. This provides uncertainty in the result of the integration.

It is desirable that integration of a signal at each pixel of a detector which is focussed upon a given small area of a scene take place for a period as long as possible and, in any event, over an extended period of time so that the noise provides a relatively small amount of the total signal and thereby diminishes its effect thereon.

SUMMARY OF THE INVENTION

In accordance with the present invention, the signal-to-noise ratio of a staring array of infrared detectors is improved by integrating over substantially the entire available signal receiving period. This is accomplished by periodically integrating the received signal, reading out a partial integration before overloading the integrating capacitor, discharging the integrating capacitor and then commencing charging of the integrating capacitor, this cycle being continually repeated. This is achieved while being able to dispose all or most of the readout integrated circuit required for integration within the area under each of the sensing elements or pixels of the array. The unit cell or the circuitry associated with each pixel repetitively integrates the incoming signal and the bias signal and background current onto a capacitor which is sufficiently small to fit beneath the associated pixel. The circuit samples each integration and then low pass filters the train of sampled data with an RC filter using large resistances and small capacitances. Since the equivalent circuit using large resistances and small capacitances requires less integrated circuit area than does small resistances and large capacitances, the desired result can be achieved. This concept is applicable to both photon o resistance bolometer (thermal) detectors.

More specifically, each cell or pixel of the array generates current proportional to the amount of infrared radiation impinging thereon and charges a first capacitor. Periodically, the charge on the capacitor is amplified and passed through a sample and hold switching element to a second capacitor and the first capacitor is discharged through a reset switch. The charge on the second capacitor is amplified and fed to a low pass filter having large resistance, on the order of $10^9$ ohms, and small capacitance, on the order of $10^{-12}$ to $10^{-13}$ farads, which substantially removes the noise in the signal and passes the noise-free signal onward to appropriate circuitry.

BRIEF DESCRIPTION OF THE DRAWING

FIG. 1 is a schematic depiction of a focal plane array with a plurality of pixels in a matrix arrangement;

FIG. 2 is a circuit diagram of a single pixel with circuitry associated therewith in accordance with the present invention;

FIGS. 3(a) to 3(c) are diagrams of the signals at stated locations in the circuit of FIG. 2; and FIG. 4 is a circuit diagram showing how resistor 25 of FIG. 2 would be implemented using diodes.

DESCRIPTION OF THE PREFERRED EMBODIMENT

Referring first to FIG. 1, there is shown a top view of a focal plane array 1 having a plurality of pixels 3 arranged therein. Each pixel 3 is coupled to separate electronic circuitry (not shown in FIG. 1) which is disposed either in the wafer containing the focal plane array and generally below the associated pixel or in a separate wafer to which the wafer containing the focal plane array is secured in known manner.

Referring now to FIG. 2, there is shown one of the pixels 3 of FIG. 1 which is depicted as a current source 11 and an integrating capacitor 13. The current source 11 represents the sum of the dark current and the photocurrent generated by the impingement of infrared radiations on the pixel, this generated current charging the integrating capacitor 13. The charge on the integrating capacitor 13 continues to build up for a predetermined time period, after which the sample and hold transistor switch 19 is rendered conducting and the charge on the capacitor 13 is amplified by amplifier 17, passes through the switch 19 and charges up capacitor 21. At this time, the sample and hold switch 19 is closed and the reset transistor 15 is turned on to discharge the capacitor 13 whereupon the reset transistor is again opened and the charging cycle for capacitor 13 is repeated. The charge on capacitor 21 is amplified through amplifier 23 and then passes through a low pass filter composed of resistor 25 and capacitor 27 and then passes to the output terminal 29 for transmission to other circuitry as required.

The purpose of the integrating capacitor 13 is to elevate the voltage noise at point A at the input to amplifier 17 over the noise generated by the amplifier 17 and KT/C sampled Johnson noise stored on the capacitor. It can be seen that the KT/C noise can be diminished by increasing the capacitance of capacitor 13. However, as stated above, an increase in capacitance of capacitor 13 requires that a larger portion of the region of the semiconductor material under the associated pixel be utilized. Due to small pixel dimensions, this portion of the region is small and limits the capacitance obtainable. Accordingly, the problem arises that the capacitance of capacitor 13 cannot be made large enough to integrate over several milliseconds in order to improve the signal to shot noise ratio. To alleviate this problem while still utilizing the small capacitance value, the low pass filter composed of resistor 25 and capacitor 27 is provided using a very large resistor. The resistance can be achieved in any known manner, such as, for example, by using forward biased diodes as set forth in copending application Ser. No. 07/680,210, filed Apr. 4, 1991 or by using almost undoped polysilicon which has been doped to a level to provide the desired resistance based upon the dimensions of the polysilicon region itself.

In operation, the charge on capacitor 13 which is at point A is shown in FIG. 3(a) where It/C is the average signal pedestal and where t is typically 5 microseconds. The integrated and sampled noise train at the capacitor 21 or at point B is shown in FIG. 3(b) where it can be seen that most of the noise has been removed. The output of the circuit at point C is shown in FIG. 3(c) where it can be seen that substantially all of the noise has been removed.

At point B, the integrator noise spectrum is indicated by:

$$V_N^2(f) = \frac{gIt^2 \sin^2 \pi ft}{\pi C^2 (ft)^2}$$

Integrating over frequency yields:

$$V_N = \frac{(gIT)^{\frac{1}{2}}}{C}$$

$$V_{S\,low\,freq} = \frac{It}{C}$$

At point C, for t << 1/delta f:

$$V_N = (gI\pi/t)^{\frac{1}{2}} \frac{t}{C} (delta\,f)^{\frac{1}{2}} \quad \text{(band limited noise)}$$

$$V_{S\,low\,freq} = It/C$$

It follows that the signal to noise improvement from point B to point C is $(\pi/t\,delta\,f)^{\frac{1}{2}}$ which is a large improvement over prior art integrator and switch capacitor techniques.

The technique for providing a resistor which has such a large resistance that the noise developed is at very low frequency and can be filtered out using diodes is set forth in the above noted copending application, the contents of which are incorporated herein by reference.

Referring now to FIG. 4, there is a circuit diagram showing how resistor 25 of FIG. 2 would be implemented using diodes. As can be seen, the resistor 25 of FIG. 2 is disposed between amplifier 23 and output terminal 29 with capacitor 27, which could be a MOSFET, coupled between terminal 29 and reference voltage. The resistor 25 is implemented using a cascode transistor 71 having a gate coupled to a voltage source $V_{GG}$, a source coupled through a diode 73 to a filter voltage source $V_{filter}$, and a drain coupled to the output terminal 29. A diode 75 has its anode coupled to the output terminal 29 and its cathode coupled to the output of amplifier 23.

The operation of the circuit of FIG. 4 is explained hereinbelow. The large band limiting time constant (about 2 ms) for the filter composed of resistor 25 corresponding to diode 75 and capacitor 27 is achieved with a forward biased diode 75 and the small standard MOS gate capacitance of 0.35 pF of capacitor 27. Using a diode bias current of about 5 pA, the required dynamic resistance of $6 \times 10^9$ ohms is achieved. The biasing current is provided by a second forward biased diode 73 in conjunction with the cascode MOSFET 71. The MOSFET is used for its extremely high ($>10^{13}$ ohms) drain impedance, while the diode 73 is used as a high impedance source to suppress effects from MOSFET threshold variations and noise by limiting its gain. Both diodes 75 and 73 could be replaced by large resistors, but one must be precisely controlled. Also, by using diodes, the frequency roll-off is controlled by adjusting the bias voltage and thereby the current in the diodes.

It is noted that the above described circuitry in FIG. 3 can also be used to improve the signal to noise ratio using a bolometer matrix wherein, instead of photo current, the signal current is generated by temperature changes in a current-biased resistor or diode sensing element (a thermal detector). In this case, the current source 11 of FIG. 2 is replaced by a resistive element with a bias thereacross to permit current to flow and be stored on the capacitor 13.

It is further noted that if the sensing element resistance is sufficiently high, such voltage signal and noise is high without the integration and sampling functions may not be required. In this case, a resistive load would be used followed by a preamplifier and a low pass filter.

Though the invention has been described with reference to specific preferred embodiments thereof, many variations and modifications will immediately become apparent to those skilled in the art. It is therefore the intention that the appended claims be interpreted as broadly as possible in view of the prior art to include all such variations and modification.

I claim:

1. A focal plane array circuit member comprising:
   (a) a pixel of predetermined area providing a charge in response to impingement of radiation thereon;
   (b) a charge storing circuit for storing said charge responsive to reception of said radiations by said pixel;
   (c) switch means for periodically transferring charge from said charge storing circuit and then discharging said charge storing circuit;
   (d) storage means for storing said transferred charge;
   (e) an output terminal; and
   (f) a low pass filter coupled between said output terminal and said storage means, (g) said structure of (b) through (f) displacing an area in a single semiconductor chip substantially the same as the area of said pixel.

2. A circuit as set forth in claim 1 wherein said charge storing circuit comprises a focal plane array detector element including a capacitor for storing charge.

3. A circuit as set forth in claim 1 wherein said switch means includes a transistor coupling said charge storing circuit to a source of reference voltage and a transistor coupling said charge storing circuit to said storage means.

4. A circuit as set forth in claim 2 wherein said switch means includes a transistor coupling said charge storing circuit to a source of reference voltage and a transistor coupling said charge storing circuit to said storage means.

5. A circuit as set forth in claim 1 wherein said low pass filter comprises a resistor having a resistance on the order of $10^9$ ohms disposed between said storage means and said output terminal and a capacitor having a capacitance on the order of $10^{-12}$ to $10^{-13}$ farads coupled between said output terminal and said source of reference voltage.

6. A circuit as set forth in claim 2 wherein said low pass filter comprises a resistor having a resistance on the order of $10^9$ ohms disposed between said storage means and said output terminal and a capacitor having a capacitance on the order of $10^{-12}$ to $10^{-13}$ farads coupled between said output terminal and said source of reference voltage.

7. A circuit as set forth in claim 3 wherein said low pass filter comprises a resistor having a resistance on the order of $10^9$ ohms disposed between said storage means and said output terminal and a capacitor having a capacitance on the order of $10^{-12}$ to $10^{-13}$ farads coupled between said output terminal and said source of reference voltage.

8. A circuit as set forth in claim 4 wherein said low pass filter comprises a resistor having a resistance on the order of $10^9$ ohms disposed between said storage means and said output terminal and a capacitor having a capacitance on the order of $10^{-12}$ to $10^{-13}$ farads coupled between said output terminal and said source of reference voltage.

9. A focal plane array circuit comprising:
   (a) a plurality of charge storing circuits arranged in a matrix, each said charge storing circuit including a pixel of predetermined area, storing a charge responsive to reception of infrared radiations on said pixels; each said charge storing circuit further including:
   (b) switch means for periodically transferring charge from said charge storing circuit and then discharging said charge storing circuit;
   (c) storage means for storing said transferred charge;
   (d) an output terminal; and
   (e) a low pass filter coupled between said output terminal and said storage means;
   (f) said structure of (a) through (e) excluding said pixel displacing an area in a single semiconductor chip substantially the same as the area of said pixel.

10. A circuit as set forth in claim 1 wherein said charge storing circuits each comprise a focal plane array detector element including a capacitor for storing charge.

11. A circuit as set forth in claim 1 wherein said switch means includes a transistor coupling said charge storing circuit to a source of reference voltage and a transistor coupling said charge storing circuit to said storage means.

12. A circuit as set forth in claim 10 wherein said switch means includes a transistor coupling said charge storing circuit to a source of reference voltage and a transistor coupling said charge storing circuit to said storage means.

13. A circuit as set forth in claim 9 wherein said low pass filter comprises a resistor having a resistance on the order of $10^9$ ohms disposed between said storage means and said output terminal and a capacitor having a capacitance on the order of $10^{-12}$ to $10^{-13}$ farads coupled between said output terminal and said source of reference voltage.

14. A circuit as set forth in claim 10 wherein said low pass filter comprises a resistor having a resistance on the order of $10^9$ ohms disposed between said storage means and said output terminal and a capacitor having a capacitance on the order of $10^{-12}$ to $10^{-13}$ farads coupled between said output terminal and said source of reference voltage.

15. A circuit as set forth in claim 11 wherein said low pass filter comprises a resistor having a resistance on the order of $10^9$ ohms disposed between said storage means and said output terminal and a capacitor having a capacitance on the order of $10^{-12}$ to $10^{-13}$ farads coupled between said output terminal and said source of reference voltage.

16. A circuit as set forth in claim 12 wherein said low pass filter comprises a resistor having a resistance on the order of $10^9$ ohms disposed between said storage means and said output terminal and a capacitor having a capacitance on the order of $10^{-12}$ to $10^{-13}$ farads coupled between said output terminal and said source of reference voltage.

17. A method of detecting infrared radiations with a focal plane array circuit member comprising the steps of:
   (a) providing a pixel of predetermined area which provides a charge in response to impingement of infrared radiations thereon;
   (b) storing said charge in a storage device indicative of the intensity of received infrared radiations;
   (c) periodically transferring said stored charge in (b) and then resetting said storage device;
   (d) storing said transferred charge;
   (e) providing an output terminal; and
   (f) providing a low pass filter coupled between said output terminal and said storage means;
   (g) said structure of (b) through (f) displacing an area in a single semiconductor chip substantially the same as the area of said pixel.

18. A method as set forth in claim 17 wherein said storage device comprises a focal plane array detector element including a capacitor for storing charge.

19. A method as set forth in claim 17 wherein said switch means includes a transistor coupling said charge storing circuit to a source of reference voltage and a transistor coupling said charge storing circuit to said storage means.

20. A method as set forth in claim 18 wherein said switch means includes a transistor coupling said charge storing circuit to a source of reference voltage and a transistor coupling said charge storing circuit to said storage means.

* * * * *